Oct. 7, 1952  L. J. MATHSON  2,612,697
ADJUSTMENT INDICATOR FOR PRECISION MACHINE TOOLS
Filed July 16, 1948  3 Sheets-Sheet 1
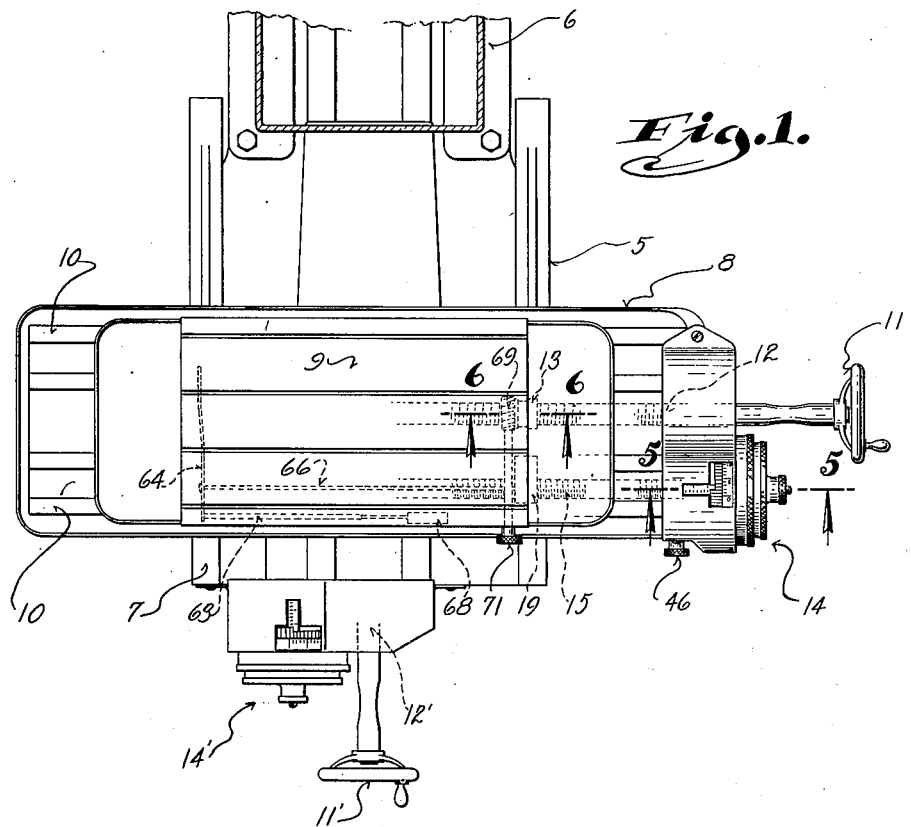
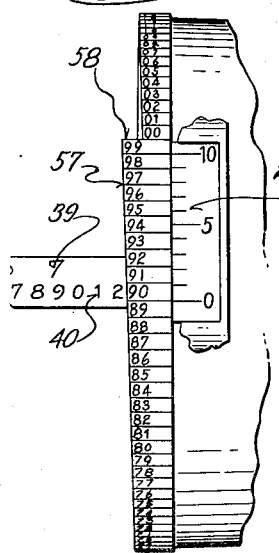
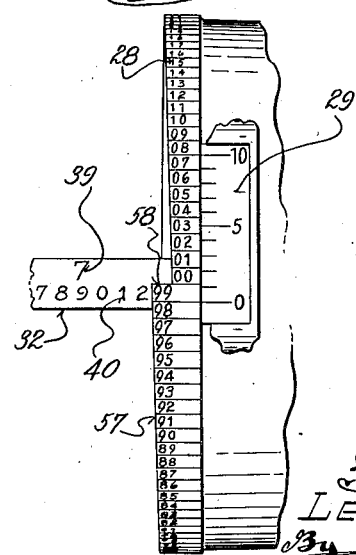
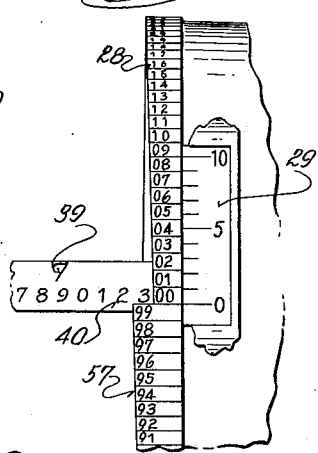

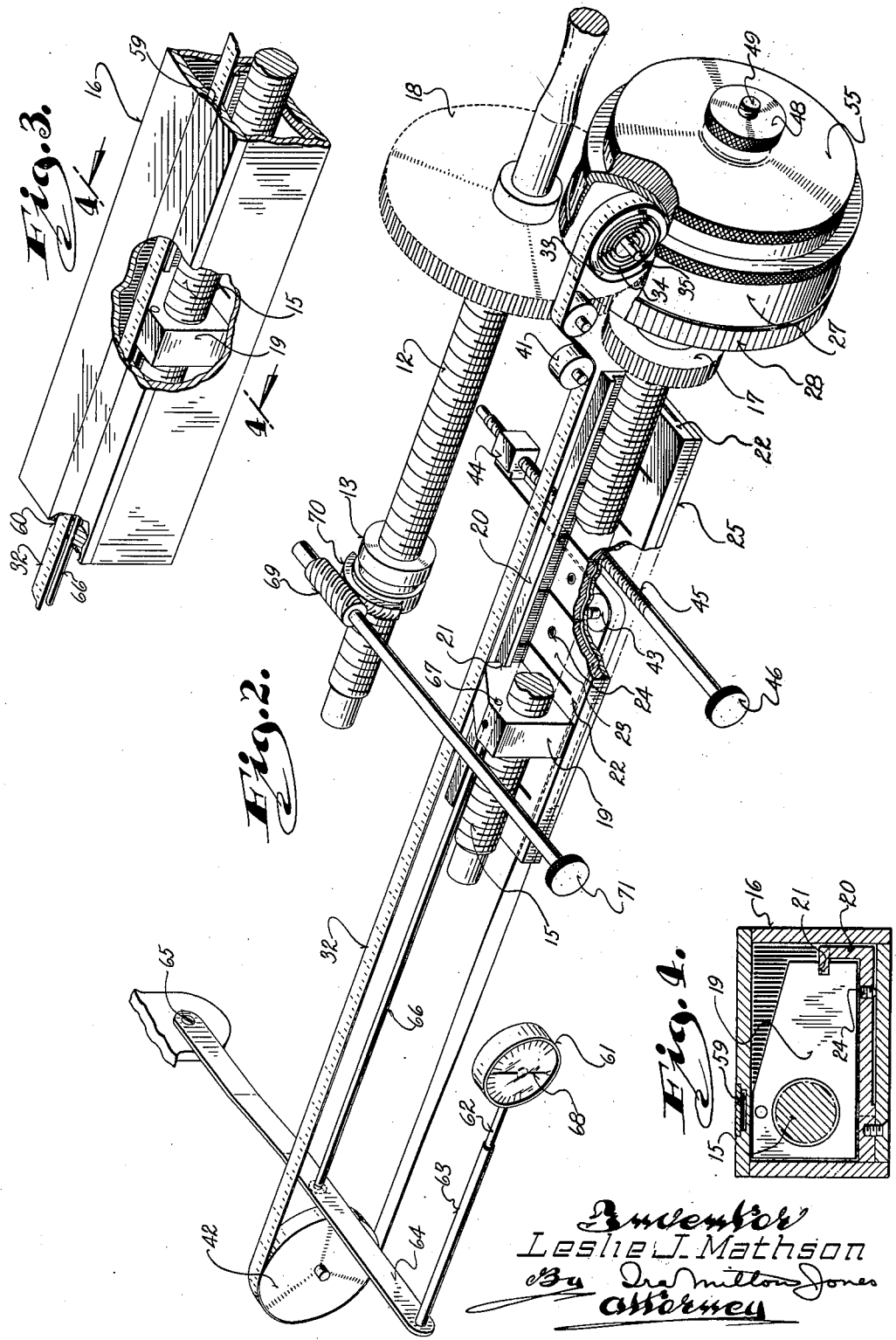

Oct. 7, 1952  L. J. MATHSON  2,612,697
ADJUSTMENT INDICATOR FOR PRECISION MACHINE TOOLS
Filed July 16, 1948  3 Sheets-Sheet 3

Inventor
Leslie J. Mathson
By Ira Milton Jones
Attorney

Patented Oct. 7, 1952

2,612,697

UNITED STATES PATENT OFFICE 2,612,697

ADJUSTMENT INDICATOR FOR PRECISION MACHINE TOOLS

Leslie J. Mathson, Franklin Township, Milwaukee County, Wis., assignor of one-half to Riteway Tool and Die Company, Milwaukee, Wis., a corporation of Wisconsin Application July 16, 1948, Serial No. 39,033

13 Claims. (Cl. 33—125)

This invention relates to machine tools and has as its object to provide an improved manner of measuring and showing extent of adjustment of a machine tool part as, for instance, the work table.

Though the invention is especially well adapted to use on jig borers it is applicable to any precision machine tool or other machine where an adjustment must be accurately measured and depicted.

In its application to jig borers the invention supplants an inconvenient and eye-straining method of measuring the adjustment of the work table and eliminates the separate end measures and inside micrometers heretofore necessary to locate the holes to be bored.

In most machine tools the work table is adjustable, both longitudinally and transversely, to bring the work into proper position to be acted upon by the tool. Thus in the case of a jig borer after the work table has been adjusted to bring the work properly in position with respect to the spindle to bore the first hole, accurately measured adjustment of the table longitudinally and transversely from that initial position enables the work to be positioned for all subsequent holes. Heretofore such adjustment of the work table required the selection of the proper number of separate end measures or gages to make up the even inches of the intended adjustment, the setting of an inside micrometer for the inch fraction, and end-to-end placement of the inside micrometer and all the end measures between a stop on the table and the feeler of a sensitive dial type indicator.

With the end measures and inside micrometer in position the table was adjusted, either manually or by power means to clamp the end measures and micrometer between the feeler of the indicator and the stop on the table and was continued until the pointer on the indicator was on zero. The same procedure obtained for both longitudinal and transverse adjustment of the table, and after the adjustment had been made in this manner the table was clamped in place.

Any displacement of the table from its intended position, as often results from severe vibration or shock and from many other causes, while visibly shown on the indicator, entailed resetting of the table by the same means used to move the table from one position of adjustment to another.

Aside from the troublesome eye-straining task of adjusting an inside micrometer which this past scheme entailed, the means heretofore available for measuring and depicting adjustment of the table was a fruitful source of error and extreme nervous tension on the part of the operator. Often it was found that though the inside micrometer had been very accurately set, the operator erred in his selection of end measures, so that the table might be off location one or more inches.

With a view toward overcoming these difficulties, the present invention provides an improved manner of measuring the adjustment of the work table of a jig borer or other machine tool, which obviates the need for separate end measures and inside micrometer and instead has an easily read measuring device built into the machine as a permanent part thereof with its entire indication readable at one spot.

Another object of this invention is to provide means for measuring the adjustment of the work table of a machine tool which has an accuracy to within ten thousandths of an inch, requires no eye-straining micrometer setting and which is so designed and constructed that its accuracy will be retained indefinitely notwithstanding inevitable wear on the mechanism for adjusting the table back and forth.

Another object of this invention is to provide means for measuring and showing extent of adjustment of a machine tool part wherein the depiction of the extent of adjustment is shown upon a large expanded scale so as to enable rapid adjustment of the machine tool part to its desired position.

Another object of this invention is to provide a visible check for the accuracy of the adjustment and by which minute displacement of the machine tool part from its intended position is immediately shown.

In this connection it is another object of this invention to provide means independent of the drive means by which the machine tool part is adjusted for effecting fine adjustment of the machine tool part, to correct any inaccuracy in the position of said part, and restore the same to its proper position as depicted on said visible check indicating means.

Another object of this invention is to provide a measuring and indicating device for the purpose described which includes a flexible tape wound upon a spring biased spool with the tape moving past an observation point as the work table is adjusted to quickly and correctly show the extent of adjustment of the work table.

Another object of this invention is to provide a rotatable dial graduated to show very fine adjustment and revolving in timed relation with the movement of the tape and mounted with its graduated edge portion positioned to travel past the observation point with the designations thereon moving successively into alignment with the indicia on the tape so as to be readable along with the tape and whereby the tape and dial coact to provide a single reading.

With a view toward facilitating adjustment of the work table from one given point to another, it is another object of this invention to provide means for effecting limited movement of the tape independently of the work table to enable the nearest even inch or full digit on the tape to be brought into view at the observation point before adjustment of the table is begun.

It is also an object of this invention to provide means for rotating the dial without moving the tape so as to enable any selected portion of the dial to be brought opposite the digits on the tape.

Still another object of this invention is to provide an improved measuring device wherein the dial and tape are so coordinated that the digits and sub-digits on the tape are hidden from view by the dial until the next succeeding digit or sub-digit should appear to thereby obviate error in reading the indication afforded jointly by the indicia on the tape and dial.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is a horizontal sectional view through the column of a jig borer and looking down onto the work table and illustrating the application of this invention thereto;

Figure 2 is a perspective view of the essential elements of the measuring device of this invention shown separated from the machine, said view being more or less diagrammatic with the idler guide roller 37 which is shown in Figure 5 omitted for sake of clarity;

Figure 3 is a perspective view showing the manner in which the delicate parts of the measuring device are enclosed and protected against dirt and extraneous matter which would interfere with the accuracy of its adjustment;

Figure 4 is a cross sectional view taken through Figure 3 on the plane of the line 4—4;

Figures 7, 8 and 9 are detail views of the dial and tape to show how they coact.

Figure 5:
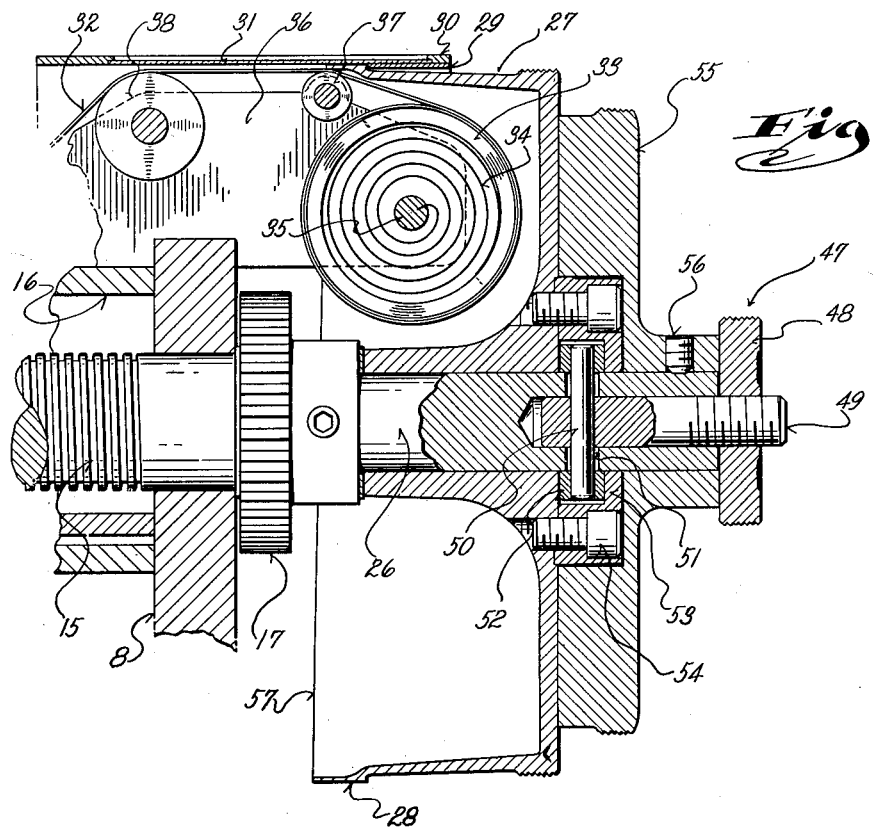
Figure 5 is a detail sectional view taken through Figure 1 on the plane of the line 5—5.
Figure 6:
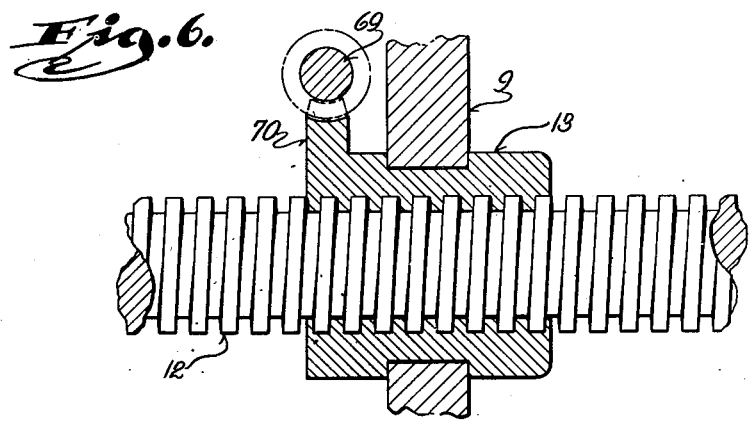
Figure 6 is a detail sectional view taken through Figure 1 on the plane of the line 6—6.

Referring now particularly to the accompanying drawings in which like numerals indicate like parts throughout the several views, the numeral 5 indicates the base of a machine tool which, in this instance, is a jig borer having the customary column 6 shown in section in Figure 1. The base 5 has the usual scrapped ways or slides 7 on which a bed 8 is slidable to effect transverse adjustment of the work table 9. To enable longitudinal adjustment of the work table the bed 8 has scrapped ways or slides 10 upon which the table rests. A hand wheel 11 and a relatively coarse screw 12 driven thereby provide means for effecting rapid traverse of the table along the longitudinal slides 10, and a similar hand wheel 11' driving a similar relatively coarse screw 12' provides means for effecting rapid traverse of the table along the ways or slides 7.

As is customary the screws 12 and 12' are threaded in nuts only one of which, 13, is shown and these nuts are constrained against axial displacement with respect to the table in one instance and with respect to the bed 8 in the other.

To accurately measure and show the extent of longitudinal adjustment of the table (effected by the screw 12 of the hand wheel 11) and also show deviation of the table from its intended position of longitudinal adjustment a measuring and sensing device indicated generally by the numeral 14 is provided. A similar measuring and sensing device 14' measures and shows the extent of transverse adjustment of the work table and deviation thereof from its intended position of transverse adjustment.

Each measuring and sensing device comprises a fine pitched accurate screw 15 journalled in bearings in the end walls of a box-like enclosure 16 which in turn is fixedly mounted on the bed 8 in one case and upon the base 5 in the other. In each instance the screw is parallel with the guided movement of its associated machine part. Thus in the device 14 the screw is parallel with the slides 10 and the movement of the table 9, and in the device 14' the screw is parallel with the slides 7 which guide the movement of the bed 8. In each instance, also, the screw 15 must be as long as the full range of adjustment of its associated movable machine part.

The screw 15 is driven from the screw shaft 12 by means of gears 17 and 18. The ratio of these gears and the pitch of the screws 12 and 15 is such that a nut 19 threaded on the screw 15 moves in unison with the nut 13 and consequently the table 9. The nut 19 is preferably made of fiber or some suitable material which will not wear the threads of the screw 15, and as will be hereinafter more fully brought out constitutes a datum member.

The nut or datum member 19 is within the enclosing housing 16 and is accurately guided for longitudinal movement by a track 20 received in a groove 21 in the nut or datum member. The track 20 is part of a compensating bar 22 mounted within the housing 16 and which has the usual segments 23 each of which is individually adjustable by a set screw 24 bearing against the bottom 25 of the housing. Through the individual set screws 24 the track 20 can be slightly deflected up or down to thus accurately guide the traverse of the nut or datum member 19 as necessary to compensate for slight inaccuracies in the screw 15. Hence, the traverse of the nut per degree of rotation of the screw 15 is accurately held to a very close tolerance.

Attention is directed to the fact that the screw 15 and the nut or datum member 19 by being encased within the housing 16 are protected against dirt and extraneous matter and run dry, thus assuring continued accuracy. This is important since the screw 15 and the nut or datum member 19 may be considered the heart of the measuring device.

As best shown in Figure 5 the unthreaded end portion 26 of the screw shaft 15 beyond its pinion 17 has a rotatable drum dial 27 mounted thereon. The edge portion 28 of this dial is graduated to provide one hundred digits or spaces, and the pitch of the screw 15 is such that rotation thereof, and consequently of the dial 27, through the angle of one such space effects traverse of the nut or datum member 19 one thousandth of an inch. A stationary vernier scale 29 mounted alongside the graduated edge portion 28 of the dial coacts with the graduations thereof to show adjustment in increments of one ten thousandth of an inch.

The vernier scale 29 is carried by a hood 30 which covers the edge portion 28 of the dial and forms part of a shield or casing which coacts with the housing 16 to protect the mechanism.

A transparent window 31 in the hood 30 provides an observation point or zone through which the indicia on the dial 27 and on a flexible measuring tape 32 are readable. The tape 32 is wound upon a spool 33 located within the hollow of the dial 27 and provided with a torsion spring 34 which yieldingly maintains torque upon the spool to wind up the tape. The axis of the spool 33 is crosswise of the screw shaft 15, and its axle 35 is journalled in bearings carried by two parallel side frames 36, only one of which is shown. Guide rollers 37 and 38 guide the tape for movement along a path directly under and parallel to the transparent window 31 and in close juxtaposition to the graduated edge 28 of the dial.

The portion of the tape visible through the transparent window 31 being directly adjacent to the indicia on the dial, it follows that the indicia on the tape which is in the form of main digits 39 indicating even inches and sub-digits 40 indicating tenths of an inch, may be read concurrently or simultaneously with the indicia of the dial. Moreover, as shown in Figures 7, 8 and 9, the indicia on the tape coacts with that on the dial to effect a composite reading.

After passing over the idler guide rollers 37 and 38 the tape passes under another guide roller 41, then extends around a pulley 42 carried by the table and from this pulley continues around a guide roller 43 set with its axis vertical. The end of the tape is secured to a relatively fixed anchor provided by a nut 44 adjustable toward and from the roller 43 by means of a screw 45 provided with a knob 46. Upon adjustment of the table back and forth the tape is either wound upon the spool 33 or unwound therefrom, with the linear travel of the tape twice the rate of movement of the table. In other words, for one inch of actual adjustment of the table, the tape travels two inches, thereby allowing greater spread between the digits on the tape.

As shown in Figures 7, 8 and 9 the sub-digits 40 on the tape align with the designations on the dial. The reading in Figure 7 is seven and 290 thousandths inches (7.290"); in Figure 8 the reading is seven and 299 thousandths inches (7.299"); while in Figure 9 the reading is seven and 300 thousandths inches (7.300").

As will be readily apparent, adjustment of the table from any given position is accompanied by a corresponding movement of the tape and dial. Thus, for instance, if the table is to be adjusted 2.290 inches it is only necessary to turn the hand wheel 11, observing the tape and dial, until 2.290 inches have been added to or substracted from the reading of the tape and dial at the start of the adjustment, depending upon whether the table is moved to the left or the right. This observation would, of course, be simplified if at the start of the adjustment the reading on the tape and dial were an even number.

The tape is, therefore, adjustable to enable the nearest even inch (one of the digits 39) to be brought into position. Such adjustment of the tape is the function of the screw 45 which shifts the tape anchor 44 one way or the other an extent sufficient to carry the tape at least the distance between two adjacent main digits 39.

To enable the dial to be brought to zero, which is obviously the most convenient starting point, a clutch arrangement indicated generally by the numeral 47 is provided. By it the dial may be freed from the shaft 26 and again locked in place at any desired point. As shown in Figure 5 this clutch mechanism 47 comprises a knurled nut 48 threaded upon a screw 49 anchored to a crosspin 50 which extends loosely through a bore 51 in the shaft 26 and has "rollers" 52 on its ends, received in a counterbore of a collar 53 fixed to the dial 27 by screws 54. The collar 53 is received within a counterbore of a disc 55 mounted upon and secured to the shaft 26 as by a set screw 56.

The nut 48 bears against the hub of the disc 55 which protrudes beyond the end of the shaft 26 and since the collar 53 is secured to the dial 27, tightening of the nut 48 draws the dial tightly against the disc 55 so that it rotates in unison therewith and, of course, with the shaft 26.

Both the dial 27 and the disc 55 have knurled peripheral portions to facilitate their manual rotation, and upon loosening of the nut 48 the dial 27 is free to be revolved about the shaft 26 and with respect to the disc 55 to enable the dial to be brought to any desired position while the shaft 26 is held against turning or, if desired or necessary, the dial 27 can be held in position while rotation is manually imparted to the shaft 26 and consequently the screw 15 by means of the disc 55.

An important feature of the measuring device and more particularly the dial 27 resides in the fact that the edge 57 of its graduated portion 28 is in the form of a uniform gradient spiral with an abrupt step 58 joining the high and low terminae of the spiral. The height of the step 58 is the distance between two adjacent sub-digits 40 on the tape and since the dial 27 makes one complete revolution during the time the tape travels the distance between its sub-digits it follows that the sub-digits on the tape are hidden from view by the edge of the dial unitl the next sub-digit should appear. This is clearly shown by comparison of Figures 8 and 9, and as can be readily appreciated, this feature greatly facilitates correct reading of the indication afforded by the indicia on the tape and dial.

It should be noted that the abrupt step 58 is on the division line between the minimum and maximum values of the graduations inscribed on the dial, specifically between "00" and "99."

The stretch of the tape 32 beyond the idler 41 preferably travels through a tunnel 59 in the top of the housing 16 and to preclude carrying dust into the observation zone under the transparent window 31 a conventional felt wiper pad 60 is provided at the entrance to the tunnel 59 to wipe the tape clean as it enters the tunnel.

As hereinbefore brought out the adjustment of the nut or datum member 19 is effected very accurately and the indication afforded conjointly by the tape and the dial is a true indication of the extent of movement of the nut or datum member from one given point to another. Concomitantly with such adjustment of the nut or datum member 19 the work table presumably is brought to its proper position of adjustment but due to the inaccuracies inevitably present in the adjusting means for the table and particularly the screw 12 positional relationship between the nut or datum member and table is not maintained during adjustment of the table.

A sensing means comprising two cooperating relatively movable elements, both of which are carried by the table with one of them fixed thereto, and indicator means responsive to relative movement between the elements indicates deviation of the table from a selected position of adjustment by depicting displacement of the table from a predetermined positional relationship thereof with respect to the datum nut. In the present embodiment of the invention these two elements are the body 61 and the feeler 62 of a dial type indicator, and the indicator per se is the pointer 68 of the dial.

The body 61 of the indicator dial is fixed on some part of the table where it can be readily seen by the operator. Its feeler 62 bears against a stem 63 which in turn bears against the free end of a leaf spring 64. The opposite end of the leaf spring is anchored as at 65 to a portion of the table and the direction of spring tension is such as to bias the free end of the spring away from the indicator feeler.

This bias of the spring is reacted against by a tension rod 66 which connects the intermediate portion of the spring with the nut or datum member 19, the rod 66 being anchored thereto as at 67. As a result of this arrangement any slight deviation of the table from its predetermined correct positional relationship with respect to the nut or datum member 19 is reflected by relative movement between the two cooperating elements, specifically the body 61 and the feeler 62, and this relative motion is shown by deflection of the indicator pointer 68. After each adjustment of the table this pointer will be off zero since the table will not move in exact unison with the nut or datum member.

To enable the table to be restored to its prescribed positional relationship with respect to the datum member and thus brought accurately to a selected position, a worm 69 meshing with a worm segment 70 on the nut 13 is provided. A knob 71 conveniently located at the front of the machine provides means for turning the worm and thus rotating the nut 13 one way or the other. Inasmuch as the nut 13 is held against endwise movement with respect to the table and since the screw 12 remains stationary it follows that by means of the knob 71 it is possible to quickly and easily bring the table to its prescribed positional relationship with respect to the datum member as shown by the indicator pointer 68 moving to zero.

An advantage of the spring leaf 64 is that it maintains the rod 66 and holds the nut or datum member 19 against one side of the thread of the screw 15. Consequently only one side of this thread need be accurately finished and also any wear on the thread of the nut or datum member will have no bearing upon the accuracy of adjustment.

Operation

Assume that the work table 9 has been properly positioned to locate the work thereon under the boring spindle (not shown) to bore the first hole. Assume also that the next hole to be bored is 2.290 inches to the right of the first hole. Now by means of the knob 46 the tape 32 is first adjusted to bring the nearest main digit 39 into position of observation, and after loosening the nut 48 to free the dial 27 the dial is rotated to align its "00" with the sub-digits on the tape. The nut 48 is then tightened, and if the nearest main digit was 7, the reading at this instant would then be 7 inches even.

The hand wheel 11 is now turned to shift the table 9 to the left as viewed in Figure 1 while the operator observes the tape and dial indicia as it passes the common observation point provided by the window 31. When the combined reading of the tape and dial is 9.290 adjustment is stopped. The datum member 19 is now exactly at the spot corresponding to the desired position of the table and the table is very nearly properly located. The extent of inaccuracy in adjustment of the table will be shown on the indicator 61.

To bring the table exactly to its selected position it is only necessary to turn the knob 71 in the right direction as shown by the deflection of the needle 68 and when the needle 68 is on zero the table is accurately adjusted. Thereafter the operator merely locks the table in place, rechecks the indicator 61 to make certain that no shift has occurred in the table setting, and is then ready to bore the next hole.

If the location of this next hole entailed transverse adjustment of the table 9 it is, of course, evident that in addition to the longitudinal adjustment of the table 9 it would be necessary to effect transverse adjustment of the bed 8, using the measuring device 14'.

From the foregoing description taken in connection with the accompanying drawings it will be readily apparent to those skilled in the art that this invention greatly facilitates the adjustment of the work table of machine tools such as jig borers and the like.

What I claim as my invention is:

1. A measuring device comprising the combination of: a flexible tape inscribed with a series of digits designating units of linear measurement; a spool upon which the tape is wound; a rotatable drum dial having a spiral side edge and an abrupt step joining the high and low termini of the spiral; means rotatably mounting the dial with its axis normal to that of the spool and with its spiral edge portion overlying the spool and the adjacent unwound portion of the tape; means for effecting simultaneous rotation of the dial in one direction and unwinding of the tape from the spool and simultaneous rotation of the dial in the other direction and winding of the tape onto the spool, said means being so timed that during one complete rotation of the dial the tape moves the distance between two adjacent digits and the height of the abrupt step in the edge of the dial and the gradient of its spiral being such that each digit on the tape is covered by the dial and remains concealed from view until the tape has moved the distance between two adjacent digits; and digits on the spiral edge portion of the dial designating fractions of said units of linear measurement and so positioned on the dial that upon rotation of the dial the digits thereon are successively brought into alignment with the digits on the tape to provide a reading in full units and a fraction thereof.

2. A measuring device comprising: a flexible measuring tape delineated with regularly spaced digits and wound upon a spool; means guiding the tape to have a stretch thereof move endwise past an observation point as the tape is unwound from and wound upon the spool; a hollow rotatable drum dial having a cylindrical peripheral flange with an exposed spirally shaped edge provided with an abrupt step joining the high and low termini of the spiral; means mounting the dial for rotation about an axis parallel to said stretch of the tape and with its cylindrical peripheral flange overlying a portion of the tape at said observation point so that upon endwise movement of the tape the digits thereon disappear under the flange or appear from thereunder depending upon the direction of tape travel; indicia on the cylindrical peripheral flange of the dial movable past said observation point and into alignment with the digits on the tape as the dial is turned; and means for effecting simultaneous rotation of the dial in one direction and unwinding of the tape from the spool and simultaneous rotation of the dial in the opposite direction and winding of the tape onto the spool, said means being so timed that during rotation of the dial the angular distance between the high and low termini of the spiral the tape moves the distance between two adjacent digits, and the height of the abrupt step in the edge of the dial and the gradient of the spiral being such that as the tape is unwound from the spool each digit on the tape covered by the flange of the dial remains concealed from view until the tape has moved the distance between two adjacent digits.

3. In a measuring device: a rotatable hollow drum dial having a cylindrical peripheral flange with an exposed edge, and indicia on the flange along its exposed edge; a flexible measuring tape having indicia thereon; a spool upon which the tape is wound; means mounting the spool within the hollow of the drum dial; means guiding the tape as it is unwound from and wound upon the spool for endwise movement along a path substantially parallel with the axis of the dial and just under said flange of the drum dial in a direction substantially parallel with the axis of the dial so that the indicia on the tape is opposite the indicia on the dial flange making them readable simultaneously; and means for rotating the dial in one direction and simultaneously winding the tape upon the spool and for rotating the dial in the opposite direction and unwinding the tape from the spool.

4. The measuring device set forth in claim 3 further characterized by the fact that said exposed edge of the dial flange is one complete spiral with an abrupt step joining the high and low termini of the spiral, said step being of a height substantially equal to the distance between adjacent indicia on the tape; and the ratio of tape movement and dial rotation being such that the tape travels the distance between two adjacent indicia on the tape for each revolution of the dial.

5. In combination with a linearly adjustable carriage of a machine tool and means for adjusting the same: a measuring device for measuring and showing the extent of adjustment of the carriage from any given point to another, said measuring device comprising an accurate screw; means mounting and constraining the screw to rotation about an axis parallel to the path of movement of the carriage; a nut threaded on said screw; means preventing free rotation of the nut about the screw and constraining it to movement along the screw; a permanent driving connection between the screw and the carriage adjusting means so that rotation of the screw and adjustment of the carriage are always concomitant, the ratio of said drive and the pitch and direction of the screw threads being such that the traverse of the datum nut along the screw in consequence to rotation of the screw is in the same direction as travel of the carriage and in unison therewith to the extent that the accuracy of the carriage adjusting means permits; a flexible tape delineated with digits for coarsely depicting the extent of adjustment of the datum nut and carriage; a spring loaded spool constrained to rotation about a fixed axis transverse to the path of movement of the carriage and the datum nut and upon which the tape is wound; a connection between the tape and the datum nut so that adjustment of the carriage and the corresponding movement of the datum nut is accompanied by movement of the tape onto or off the spool depending upon the direction in which the carriage is adjusted; a rotatable drum dial; means mounting the drum dial with its axis parallel to the path of movement of the carriage and with its periphery closely adjacent to the tape as it moves past an observation point; indicia on and around the periphery of said dial for depicting fine adjustment of the datum nut, and, to the extent that the accuracy of the carriage adjusting means permits, of the carriage, rotation of the dial bringing the indicia thereon successively into alignment with the digits on the tape so as to be read along with the digits on the tape; and means for rotating said dial in unison with the screw so that with each rotation of the dial the tape moves the same predetermined distance.

6. The combination of claim 5 further characterized by the fact that the flexible tape has main digits and sub-digits; and by the provision of means for winding or unwinding the tape from the spool without shifting the position of the member to be adjusted so that the tape can always be brought to the position at which a main digit is at the observation point before adjustment of said member takes place.

7. In a machine tool having a part to be adjusted and drive means for adjusting said machine part: automatic movable measuring means built into the machine tool as a permanent part thereof for measuring and showing the extent of adjustment of said machine part from any given position, said measuring means comprising a hollow rotatable drum dial having indicia on its cylindrical surface along one edge thereof; a flexible measuring tape having indicia thereon; a spool upon which the tape is wound; means mounting the spool within the hollow of the drum dial; means guiding the tape as it is unwound from and wound upon the spool for movement along a path just under said edge portion of the drum dial in a direction substantially parallel with the axis of the dial so that the indicia on the tape is opposite the indicia on the dial making them readable simultaneously; and means for rotating the dial in one direction and simultaneously winding the tape upon the spool and for rotating the dial in the other direction and unwinding the tape from the spool.

8. In a machine tool having a movable carriage, the combination of: means for adjusting the position of the carriage; an accurate measuring screw parallel with the carriage movement; means drivingly connecting the screw with the carriage adjusting means to effect rotation of the screw in the direction and at a rate of rotation such that a member having threaded engagement with the screw moves therealong in the same direction as and in unison with the carriage to the extent that the accuracy of the means for adjusting the carriage permits; sensing means for showing deviation of the carriage from a selected position of adjustment and indicating the need for supplementary adjustment of the carriage, said sensing means including a shiftable datum member having threaded engagement with and mounted upon the screw; means constraining the datum member to movement along said accurate screw at a uniform rate per degree of rotation of the screw; measuring means for automatically measuring and showing the extent of carriage adjustment from any given position, said measuring means being a permanent part of the machine and comprising two cooperating movable indicia carrying elements, one of said elements providing a coarse indication of carriage adjustment; means connecting the coarse indicating element with the carriage so that said element moves concomitantly with the carriage; means connecting the other of said elements with the accurate measuring screw so that said other indicating element accurately depicts the position of the datum member on the screw; and supplementary adjusting means in addition to said carriage adjusting means for effecting fine adjustment of the carriage whereby the carriage may be restored to its given position as shown on said sensing means without disturbing the carriage adjusting means.

9. In a machine tool having a movable carriage and means for adjusting the position of the carriage, the combination of: a movable datum member; means constraining the datum member to movement along an accurately defined path; means driven from the carriage adjusting means for accurately moving said datum member along its defined path in the same direction as and in unison with said carriage to the extent that the accuracy of the carriage adjusting means permits; measuring means built into the machine as a permanent part thereof for measuring and showing the extent of adjustment of said carriage, said measuring means comprising two cooperating movable indicia carrying elements, one of which provides a coarse indication of carriage adjustment; means connecting said coarse indicating element with the carriage so that adjustment of the carriage moves the same; a connection between the other of said elements and the datum member moving means so that said other element depicts the exact position of said datum member on its defined path; sensing means connected between said datum member and the carriage for showing minute deviation of the carriage from a selected position of adjustment; and means in addition to said carriage adjusting means for restoring the carriage to its proper positional relationship with respect to the datum member to thereby correct the deviation indicated on the sensing means.

10. In a machine tool having a movable carriage and a support therefor constraining the carriage to linear adjustability on said support, means for adjusting the position of the carriage and supplementary adjusting means for correcting deviation of the carriage from any selected position of adjustment on its support, sensing means for showing inaccuracy in the adjustment of the carriage and deviation thereof from a selected position of adjustment, said sensing means comprising an accurate screw at least as long as the range of adjustment of the carriage on its support; bearings fixed on the carriage support having the screw journaled therein; said bearings constraining the screw to rotation about an axis parallel to the linear adjustability of the carriage and holding the screw against endwise displacement with respect to the carriage support; a datum nut threaded on and directly supported solely by the screw; a guide member having sliding engagement with the datum nut, said sliding engagement between the guide member and the datum nut providing for axial movement of the datum nut with respect to the guide member while at the same time holding the datum nut against free rotation about the screw; a permanent drive between the screw and the carriage adjusting means so that rotation of the screw and adjustment of the carriage are always concomitant; the ratio of said drive and the pitch and direction of the screw threads being such that the traverse of the datum nut along the screw in consequence to rotation of the screw is in the same direction as travel of the carriage and in unison therewith to the extent that the accuracy of the carriage adjusting means permits; means for turning the screw to effect translation of the datum nut along the screw and guide track the exact distance it is desired to move the carriage from one position thereof to another and at the same time bring the carriage ostensibly to its selected position of adjustment, inaccuracy in the adjustment of the carriage and deviation thereof from its selected position being reflected by a corresponding bodily relative displacement between the carriage and datum nut from the predetermined positional relationship which obtains when the carriage is exactly in its selected position of adjustment; and sensitive indicator means connected between the datum nut and the carriage and responsive to such bodily relative displacement between the carriage and datum nut for depicting the same and thereby showing the need for supplementary adjustment of the carriage.

11. In a machine tool, the sensing means of claim 10 wherein the sensitive indicator means comprises: a pair of cooperating relatively movable elements both of which are carried by the carriage; one of said elements being fixed with respect to the carriage; a motion transmitting connection between the other of said elements and the datum nut, so that the relative positions of said elements with respect to one another reflects the accuracy of the position of the carriage; and means for accurately depicting the relative positions of said elements.

12. In a machine tool, the structure set forth in claim 10, further characterized by: measuring means forming a permanent part of the device and having a part thereof connected with the screw for showing the distance the datum nut is moved from one position to another.

13. In a machine tool, the sensing means of claim 10, wherein the means for holding the datum nut against free rotation about the screw comprises: a guide track fixed on the carriage support parallel to the screw and extending along the length thereof; and a sliding connection between the datum nut and the guide track through which the guide track holds the datum nut against free rotation about the screw, and accurately guides the same to uniform traverse per degree of rotation of the screw.

LESLIE J. MATHSON.

REFERENCES CITED

The following references are of record in the file of this patent:

UNITED STATES PATENTS

| Number | Name | Date |
|---|---|---|
| 1,263,142 | Stubbs | Apr. 16, 1918 |
| 1,459,917 | McCann | June 26, 1923 |
| 1,611,879 | Bremer | Dec. 28, 1926 |
| 1,700,361 | Asbury | Jan. 29, 1929 |
| 1,734,068 | Ziola | Nov. 5, 1929 |
| 1,769,957 | Krotee | July 8, 1930 |
| 1,787,298 | Ziola | Dec. 30, 1930 |
| 2,125,584 | Rotzoll | Aug. 2, 1938 |
| 2,169,159 | Moller | Aug. 8, 1939 |
| 2,230,864 | Edwards et al. | Feb. 4, 1941 |
| 2,309,299 | Bickel | Jan. 26, 1943 |
| 2,328,732 | McKinney | Sept. 7, 1943 |
| 2,409,288 | Leland | Oct. 15, 1946 |
| 2,412,957 | Barnes | Dec. 24, 1946 |
| 2,431,036 | Grisdale et al. | Nov. 18, 1947 |

FOREIGN PATENTS

| Number | Country | Date |
|---|---|---|
| 408,394 | Great Britain | Apr. 12, 1934 |